(12) United States Patent
Koukan et al.

(10) Patent No.: US 9,776,502 B2
(45) Date of Patent: Oct. 3, 2017

(54) FILLER NECK FOR A MOTOR VEHICLE OPERATING-LIQUID TANK

(71) Applicant: KAUTEX TEXTRON GMBH & CO., KG, Bonn (DE)

(72) Inventors: Ibrahim Koukan, Cologne (DE); Jaroslav Maglovski, Lohmar (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days.

(21) Appl. No.: 15/028,683

(22) PCT Filed: Oct. 7, 2014

(86) PCT No.: PCT/EP2014/071409
§ 371 (c)(1),
(2) Date: Apr. 11, 2016

(87) PCT Pub. No.: WO2015/052166
PCT Pub. Date: Apr. 16, 2015

(65) Prior Publication Data
US 2016/0263989 A1    Sep. 15, 2016

(30) Foreign Application Priority Data

Oct. 9, 2013    (DE) .................. 10 2013 016 684

(51) Int. Cl.
*B60K 13/04*    (2006.01)
*B60K 15/035*    (2006.01)
*B60K 15/04*    (2006.01)

(52) U.S. Cl.
CPC ............ *B60K 15/035* (2013.01); *B60K 13/04* (2013.01); *B60K 15/04* (2013.01);
(Continued)

(58) Field of Classification Search
CPC .................. B60K 15/035; B60K 15/04; B60K 2015/03538; B60K 2015/03552; B60K 13/04
(Continued)

(56) References Cited

U.S. PATENT DOCUMENTS 4,718,568 A * 1/1988 Dal Palu ................ B60K 15/04
138/113
4,816,045 A * 3/1989 Szlaga ................... B60K 15/04
141/286
(Continued)

FOREIGN PATENT DOCUMENTS

DE    8630617 U1    3/1987
DE    69305024 T2    4/1997
(Continued)

OTHER PUBLICATIONS

English PCT International Search Report mailed Feb. 3, 2015, received in corresponding PCT Application No. PCT/EP14/71409, 3 pgs.
(Continued)

*Primary Examiner* — King M Chu
(74) *Attorney, Agent, or Firm* — Grossman, Tucker, Perreault & Pfleger, PLLC

(57) ABSTRACT

The invention relates to a filler neck for an operating-liquid tank (3) for a motor vehicle. The filler neck (1) comprises a mouth-hole neck (11), into which a nozzle can be inserted in order to fill the operating-liquid tank (3). A ventilation path is provided in the filler neck (1), which ventilation path allows a ventilation flow parallel and oppositely to the filling volumetric flow through the mouth-hole neck (11) during filling. The filler neck (1) according to the invention is characterized in that the ventilation path comprises at least one ventilation channel (18) provided in a wall arrangement (14) of the mouth-hole neck (11), which at least one venti- (Continued)

lation channel is at least partially surrounded by an outer wall (14a) and an inner wall (14b) of the wall arrangement (14) along the longitudinal extent of the at least one ventilation channel.

9 Claims, 9 Drawing Sheets

(52) U.S. Cl.
CPC ............... *B60K 2015/03538* (2013.01); *B60K 2015/03552* (2013.01); *F01N 2610/02* (2013.01); *F01N 2610/1413* (2013.01); *F01N 2610/1466* (2013.01)

(58) Field of Classification Search
USPC ...................................... 220/86.2, 86.1, 89.1
See application file for complete search history.

(56) References Cited

U.S. PATENT DOCUMENTS

| | | | | |
|---|---|---|---|---|
| 5,103,877 | A * | 4/1992 | Sherwood | B60K 15/03519 123/519 |
| 5,195,566 | A * | 3/1993 | Ott | B60K 15/0406 141/312 |
| 5,275,213 | A * | 1/1994 | Perkins | B60K 15/035 141/286 |
| 5,503,199 | A * | 4/1996 | Whitley, II | B60K 15/04 141/286 |
| 6,032,821 | A * | 3/2000 | Martin | C02F 1/42 137/590 |
| 6,340,093 | B1 * | 1/2002 | Zapp | B60K 15/04 220/86.1 |
| 6,497,335 | B2 * | 12/2002 | Low | B60K 15/03504 220/563 |
| 6,571,836 | B2 * | 6/2003 | Ephraim | B01D 27/08 141/285 |
| 6,834,770 | B2 * | 12/2004 | Lo | B65D 90/545 138/89 |
| 6,843,267 | B1 * | 1/2005 | Van Schaftingen | B60K 15/03177 137/202 |
| 7,360,565 | B2 * | 4/2008 | Peterson | B60K 15/04 141/285 |
| 8,235,078 | B2 * | 8/2012 | Horlacher | B60K 15/04 141/350 |
| 8,517,198 | B2 * | 8/2013 | Muto | B62J 35/00 220/86.1 |
| 9,096,124 | B2 * | 8/2015 | Whelan | B60K 15/035 |
| 9,409,476 | B2 * | 8/2016 | Randolph | B60K 15/0406 |
| 2007/0108211 | A1 | 5/2007 | Zhu | |
| 2013/0306665 | A1 * | 11/2013 | Eberhardt | B60K 15/04 220/746 |

FOREIGN PATENT DOCUMENTS

| | | |
|---|---|---|
| DE | 202005011575 U1 | 11/2006 |
| WO | 2012/020313 | 2/2012 |

OTHER PUBLICATIONS

PCT Written Opinion mailed Feb. 3, 2015, received in corresponding PCT Application No. PCT/EP14/71409, 6 pgs.
English translation of PCT International Preliminary Report on Patentability issued Jan. 22, 2016, received in corresponding PCT Application No. PCT/EP14/71409, 8 pgs.

\* cited by examiner

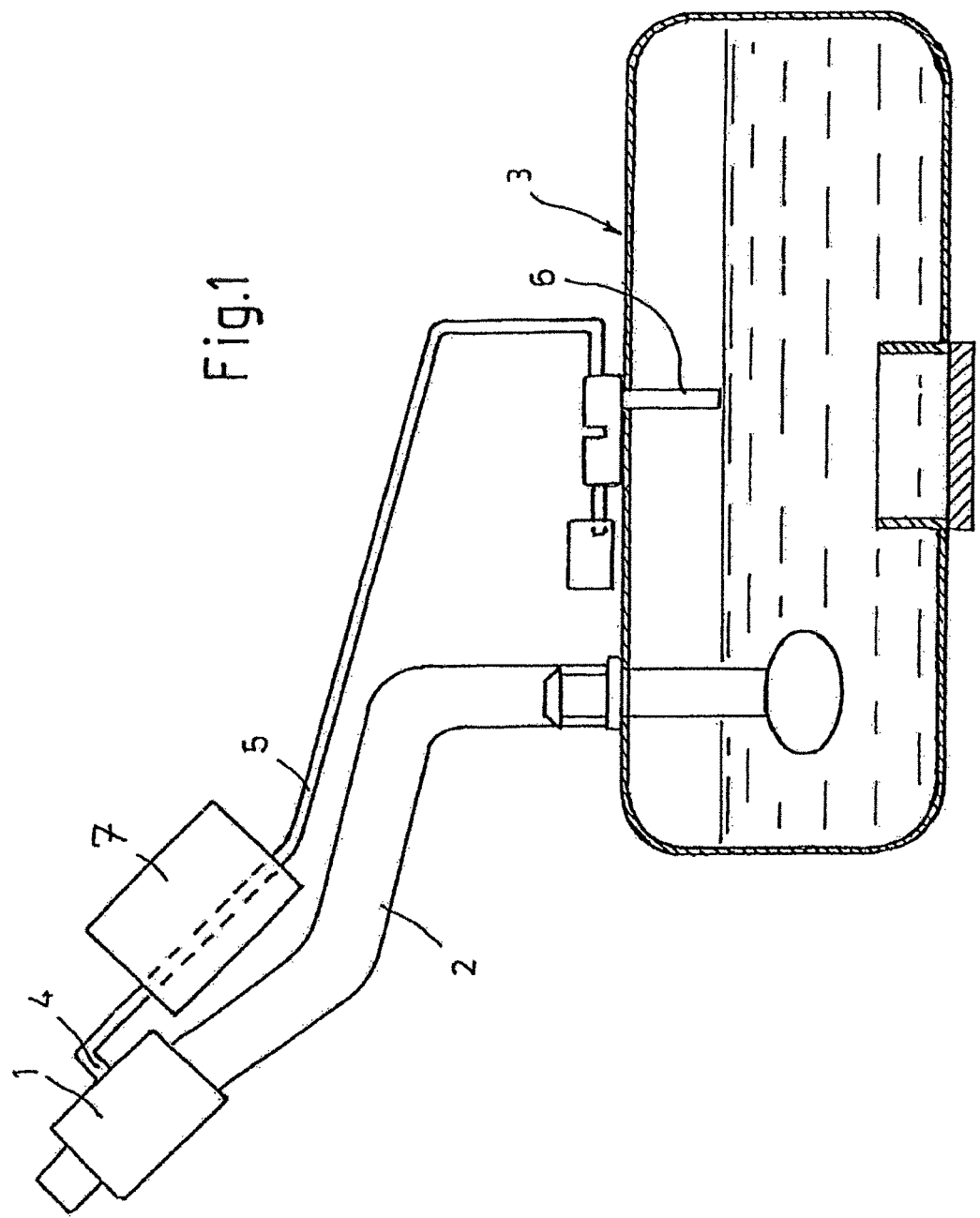

FILLER NECK FOR A MOTOR VEHICLE OPERATING-LIQUID TANK

The invention relates to a filler neck for a motor vehicle operating liquid tank, wherein the filler neck comprises a mouth hole neck in which a dispensing valve member can be introduced in order to fill the operating liquid tank, and wherein there is provided in the filler neck a ventilation path which during the filling operation permits a ventilation flow parallel with and counter to the filling volume flow through the mouth hole neck.

The operating liquid tank may be a fuel tank, a urea container for use in the SCR (selective catalytic reduction) method or another motor vehicle operating liquid tank.

When filling motor vehicle operating liquid tanks, for example by means of a dispensing valve member, operating liquid can be discharged via the filler neck. When the valve is switched off by means of a blowhole/shutdown hole on the dispensing valve member, the pressure shocks which are produced in this instance lead to a surging and receding quantity of liquid which, depending on the structure of the filler neck may also spray outward from the filler neck in some cases. In particular when filling with urea, this leads to undesirable occurrences of external contamination on the filler neck and on the vehicle.

Thus, in the event of so-called "spitback", as a result of the dispensing valve member being switched off and the resultant formation of waves in the filler neck, drops of operating liquid are sprayed through ventilation openings out of the filler neck. In the event of so-called "splashback", as a result of the dispensing valve member being switched off and/or as a result of the operating liquid being discharged from the dispensing valve member striking a liquid column during the filling operation, larger quantities of liquid are discharged from ventilation openings of the filler neck.

On the one hand, the ventilation capacity, that is to say the quantity of gas which can be discharged per time unit by means of ventilation devices, is intended to be increased by filler necks so that the time for filling the operating liquid tank can be reduced and, on the other hand, at the same time the spitback and the splashback are intended to be reduced. However, both these objectives have previously not been able to be achieved together since the greater the ventilation capacity of a filler neck is, the greater the cross-sectional surface areas of the ventilation channels have to be, which leads to greater spitback and splashback of the filler neck.

DE 10 2011 009 745 A1 discloses a generic filler neck in which the ventilation path to the atmosphere comprises a plurality of grooves which extend in an axial direction in the inner wall of the mouth hole neck. These grooves form, together with a dispensing valve member which is introduced into the mouth hole neck, a gas discharge channel to the atmosphere.

The filler neck known from DE 10 2011 009 745 A1 already has good ventilation properties when the operating liquid tank is filled. However, the dispensing valve member must have a specific diameter so that the gas discharge channels are formed and delimited by the groove profile of the mouth hole neck and by the outer wall of the dispensing valve member. Furthermore, the cross-sectional surface area of the gas discharge channels is limited so that the spitback and the splashback do not become excessively large. With an excessively small diameter of the dispensing valve member, an operating liquid film can also be formed as a result of the capillary effect between the profile peaks of the grooves and the dispensing valve member so that, during ventilation, the operating liquid can be carried along by the ventilation flow.

DE69305024 T2 discloses a filler neck for a petrol tank. The filler neck comprises a frustoconical member, wherein in a first embodiment a partition wall is provided inside the frustoconical member so that there are formed ventilation channels which are separated from each other by radial partition walls. In another embodiment of the filler neck, there are provided inside the frustoconical member radially projecting walls which separate ventilation channels from each other which are formed by the introduction of a dispensing valve member into the filler neck, by the radial projections with the outer wall of the dispensing valve member.

DE 20 2005 011 575 U1 discloses a filler neck for a container. The filler neck comprises a mouth hole neck, in which a dispensing valve member can be introduced in order to fill the container. There is provided in the filler neck a ventilation path which allows a ventilation flow during filling in a manner parallel with and counter to the filling volume flow through the mouth hole neck. In this instance, the ventilation path comprises a plurality of ventilation channels which are provided in a wall of the mouth hole neck and which are surrounded over the longitudinal extent thereof by an outer wall and an inner wall of the wall.

An object of the present invention is to provide an improved filler neck which ensures an increased ventilation capacity with at the same time reduced discharge of operating liquid through the filler neck during the filling operation.

The object of the present invention is achieved by a filler neck having the features of claim 1. Advantageous embodiments are described in the dependent claims.

More specifically, the filler neck according to the invention is distinguished in that the ventilation path comprises at least one ventilation channel which is provided in a wall of the mouth hole neck and which is surrounded over the longitudinal extent at least partially by an outer wall and an inner wall of the wall.

Of course, the filler neck comprises a filling channel which is connected in fluid terms to the mouth hole neck and the operating liquid tank. The mouth hole neck may also be referred to as a cylinder neck and the ventilation channel may also be referred to as a longitudinal channel, an axially extending annular gap or also as a curved channel. The ventilation channel in the installation position of the filler neck is connected in fluid terms to the inner space of the operating liquid tank and, for example, to the atmosphere.

As a result of the separation of the ventilation channel from the filler channel of the filler neck, the filler neck according to the invention has a ventilation cross section which is independent of the dispensing valve member. It is thereby possible to increase the ventilation cross section in comparison with filler necks known from the prior art without the filler neck having increased "spitback" or "splashback".

Consequently, the filler neck according to the invention combines the features which could not previously be combined with each other of an increased ventilation cross section of the ventilation channels or the ventilation channel and a reduction of the "spitback" or the "splashback" when the operating liquid tank is being filled. Furthermore, a so-called "blowout" in which drops of liquid are sprayed out of the filler head or the filler neck during the filling operation is avoided since the ventilation channel or the ventilation channels are not in direct fluid contact with the filler channel of the mouth hole neck.

Another advantage of the filler neck according to the invention is the possibility of increasing the degree of standardization of filler necks since dispensing valve members with different diameters can be used with the filler neck according to the invention so that one and the same filler neck can be used for different dispensing valve members.

Preferably, the ventilation path of the filler neck comprises at least two ventilation channels which are separated from each other by means of a radial wall which is connected to the inner wall and the outer wall. A correspondingly constructed filler neck is particularly simple in terms of its production and further has a great mechanical stability. Furthermore, the radial wall also acts in the case of "spitback", "splashback" or "blowout" as a wall on which the corresponding operating liquid drops are separated and directed back in the direction of the filler neck. Naturally, the ventilation path may also comprise more than two ventilation channels which are separated from each other by a radial wall which is connected to the inner wall and the outer wall.

Preferably, the ventilation channel or the ventilation channels is/are constructed in a conical manner, wherein the ventilation channel or the ventilation channels taper(s) from the end facing the operating liquid tank to the mouth hole opening thereof.

The tapering of the ventilation channel or the ventilation channels may be associated with the cross-sectional surface area of the ventilation channel/ventilation channels becoming smaller. However, it is also possible, in spite of tapering of the ventilation channel/ventilation channels in an expansion direction, for the cross-sectional surface area of the ventilation channel/ventilation channels to remain substantially constant over the longitudinal extent thereof. This may, for example, be achieved by the width extent of the ventilation channel/ventilation channels increasing to the same extent when the spacing of the radially opposed outer wall and inner wall becomes smaller over the longitudinal extent.

As a result of the tapering of the ventilation channel/ventilation channels, the discharge of operating liquid droplets through the ventilation channel/ventilation channels is further reduced since the liquid, as a result of the obliquely extending boundary walls of the ventilation channel/ventilation channels, can be more effectively separated and subsequently directed back again in the direction of the filler neck.

Preferably, the inner wall of the wall which surrounds the ventilation channel/ventilation channels has in the region of the end facing away from the mouth hole opening at least one material recess which is such that the ventilation channel/ventilation channels in the region facing away from the mouth hole opening is/are open in the direction toward the inner space of the mouth hole neck.

As a result of a corresponding construction of the filler neck, the cross-sectional surface area of the ventilation channel/ventilation channels in the lower region of the filler neck is increased so that particularly effective ventilation is enabled by means of the filler neck.

Preferably, the inner wall of the wall which surrounds the ventilation channel/ventilation channels has in the region of the mouth hole opening at least one material recess which is such that the ventilation channel/ventilation channels in the region of the mouth hole opening is/are open in the direction toward the inner space of the mouth hole neck. Alternatively and/or additionally, the outer wall may have a material recess in the upper region of the mouth hole neck.

A correspondingly constructed filler neck has improved ventilation properties and an increased ventilation volume flow. Furthermore, a correspondingly constructed filler neck has a low tendency for "spitback" and "splashback".

Preferably, there is provided in the filler neck an annular magnet which with respect to the ventilation flow is arranged upstream and with respect to the operating liquid filling direction is arranged downstream of the mouth hole neck.

In this instance, the ventilation path is preferably guided along the outer side of the annular magnet.

With a corresponding construction of the filler neck, the filler channel, via which the operating liquid is introduced into the operating liquid container, and the ventilation channel are completely separated from each other. Furthermore, the ventilation path in the region of the annular magnet is not delimited by the inner diameter thereof so that improved ventilation with a high ventilation volume flow is enabled.

Preferably, the ventilation channel/the ventilation channels is/are in a plan view of the mouth hole neck arranged so as not to extend completely in the wall thereof.

In a further preferred manner, the ventilation channel/the ventilation channels extend(s) in a plan view of the mouth hole neck through less than 300° round the periphery of the mouth hole neck. It is also possible for the ventilation channel/the ventilation channels to extend through less than 270° or less than 180° round the periphery of the mouth hole neck.

As a result of a corresponding construction of the filler neck, it is possible in the installation position of the filler neck for the ventilation channel/the ventilation channels to be arranged in the upper region of the mouth hole neck so that the lower ends of the ventilation channel/the ventilation channels are not covered by the operating liquid when, for example, a refueling operation is carried out. In turn, this leads to the ventilation channels being wetted by less operating liquid or no operating liquid at all so that a correspondingly constructed filler neck has a reduced "spitback" or "splashback".

Preferably, the ventilation channel/the ventilation channels has/have in total a cross-sectional surface area of between 10 mm$^2$ and 100 mm$^2$.

In a further preferred manner, the ventilation channel/the ventilation channels has/have in total a cross-sectional surface area of between 20 mm$^2$ and 80 mm$^2$. In an extremely preferred manner, the ventilation channel/the ventilation channels has/have a cross-sectional surface area of between 40 mm$^2$ and 70 mm$^2$.

As a result of a corresponding construction of the filler neck and a corresponding sizing of the ventilation channel/the ventilation channels, a ventilation volume flow of 40 l/min can be ensured, which is desirable for the filling of the operating liquid tank.

Other advantages, details and features of the invention will be appreciated from the embodiments explained below. In the drawings:

FIG. 1 is a cross section through an operating liquid container with a filler neck according to the invention;

FIG. 2b is a lateral sectioned illustration of the upper portion of the filler neck illustrated in FIG. 2a;

FIG. 3b is a plan view of the lower side of the upper portion of the filler neck illustrated in FIG. 3a;

FIG. 4b is a lateral sectioned view of the upper portion of the filler neck illustrated in FIG. 4a;

FIG. 5b is a plan view of the lower side of the upper portion of the filler neck illustrated in FIG. 5a;

In the description which now follows, the same reference numerals refer to identical components or identical features so that a description given with reference to a figure in relation to a component also applies to the other figures so that a repetition of the description is prevented.

Figure 2A:
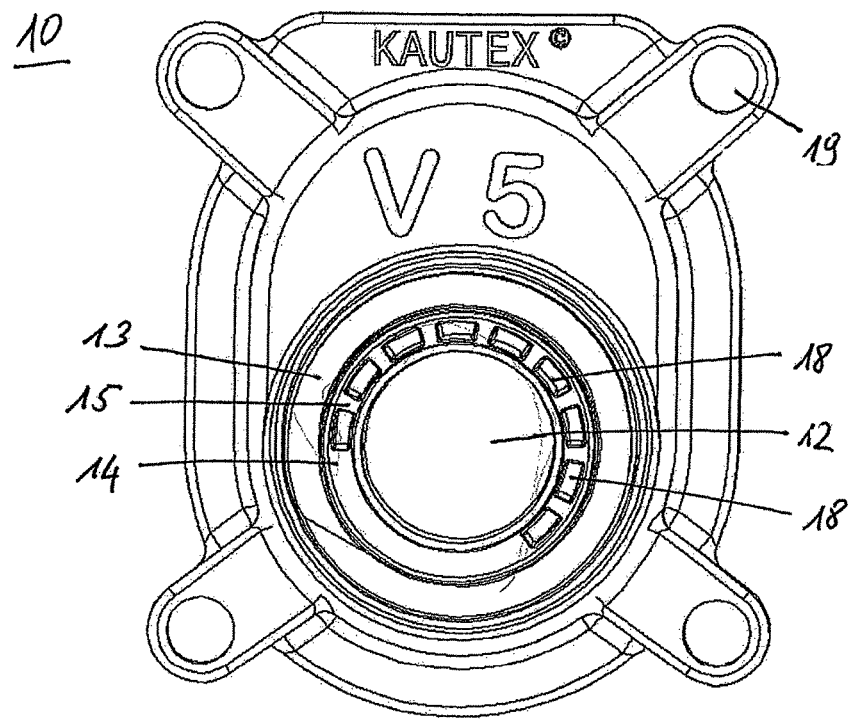
FIG. 2a is a plan view of the upper side of the upper portion of a filler neck according to a first embodiment of the present invention.

As can be seen in FIG. 1, the filler neck 1 according to the invention is arranged on a filler pipe 2 of an operating liquid tank 3. This operating liquid tank is in the embodiment described constructed as a urea container for a liquid urea solution as a reduction medium for the catalytic exhaust gas denitrification in a motor vehicle.

The operating liquid container 3 may be constructed as an integrally constructed extrusion blow-molded plastics material tank. The filler pipe 2 and the filler neck 1 may also comprise thermoplastic plastics material. An upper portion 10 of the filler neck 1, which is described with reference to the following Figures, and the remaining components described may also be produced with an injection-molding method. In the embodiment described, the entire arrangement comprising the filler neck 1, filler pipe 2 and operating liquid tank 3 is in multiple parts. The filler neck 1 is, as will be described below, constructed as a filler head with a connection 4 for a filling ventilation line 5. The filling ventilation line 5 opens via an immersion pipe 6 as a switch-off nipple in a predetermined ventilation position in the operating liquid tank 3.

The filling ventilation line 5 is guided from the operating liquid tank 3 to the filler neck 1 via a compensation container 7 which acts as a collection container for any liquid which accumulates in the filling ventilation line 5. When the operating liquid tank 3 is filled, a urea solution is directed into the operating liquid tank 3 via a dispensing valve member not illustrated in the figures, with the result that the liquid level rises therein and the gas which occurs in the operating liquid tank 3 is displaced via the filling ventilation line 5 to the filler neck 1 until the rising liquid level closes the immersion pipe 6. Then, the liquid level in the filler pipe 2 increases until it reaches and closes a shutdown hole 8 on a dispensing valve member which is not illustrated in the figures, with the result that a switching operation of the dispensing valve member is initiated. The filling operation is consequently ended.

Figure 2B:
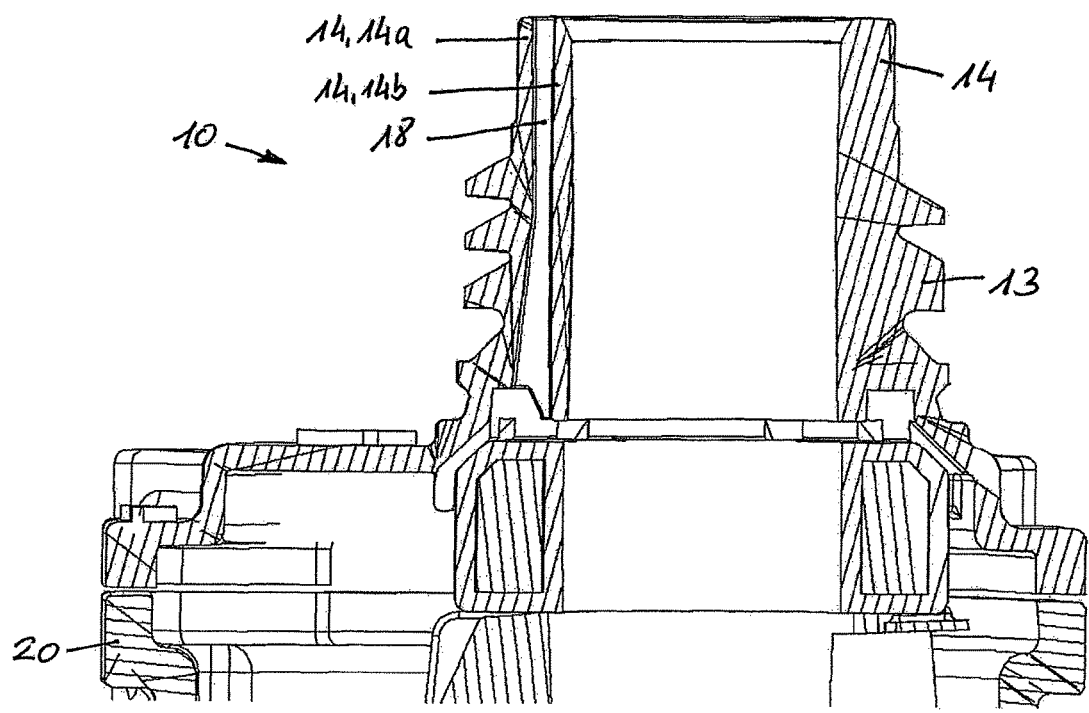

FIGS. 2a and 2b show different views of an upper portion 10 of the filler neck 1 illustrated in FIG. 1. In this instance, FIG. 2a is a plan view of the upper side of the upper portion 10 and FIG. 2b is a laterally sectioned illustration of the upper portion 10 illustrated in FIG. 2a.

In the figures, it can be seen that the upper portion 10 comprises a mouth hole neck 11, at the upper end of which a mouth hole opening 12 or mouth hole 12 is provided. Through the mouth hole opening 12, a dispensing valve member which is not illustrated in the Figures can be introduced into the inner space of the filler neck 10.

Figures 6A, 6B:
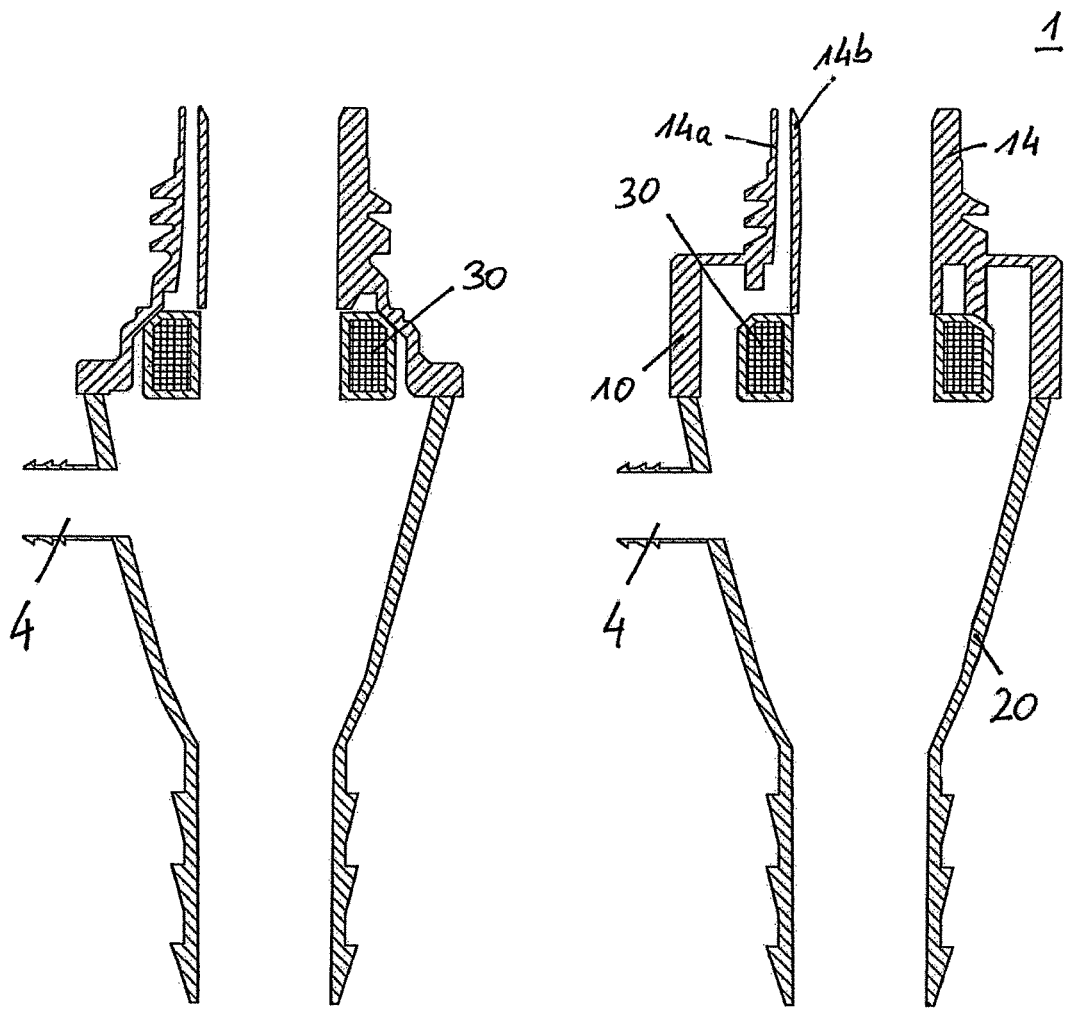
FIG. 6a is a cross-sectional illustration through a filler neck known from the prior art.
FIG. 6b is a cross-sectional illustration through a filler neck according to the invention.

The upper portion 10 comprises in the embodiment illustrated four securing openings 19 through which, for example, securing screws can be guided and connected to a lower portion 20 of the filler neck 1 as illustrated in FIG. 6b.

In the filler neck 1 there is provided a ventilation path which during the filling operation permits a ventilation flow parallel with and counter to the filling volume flow through the mouth hole neck 11. The ventilation path comprises in the embodiment of the ventilation neck 1 illustrated in FIGS. 2a and 2b nine ventilation channels 18 which are surrounded over the longitudinal extent of the mouth hole neck 11 by an outer wall 14a and an inner wall 14b of the wall 14. The respective ventilation channels 18 are further separated from each other by means of radial walls 15. The ventilation channels 18 are consequently constructed as passages or holes 18 through the wall 14 of the mouth hole neck 11.

In the plan view of FIG. 2a, it can be seen that the ventilation channels 18 extend over an angle of approximately 300° around the periphery of the mouth hole neck 11. It can thereby be ensured that, in the installation position of the filler neck 1, the lower ends of the ventilation channels 18, for example, during a refueling operation, are not covered by operating liquid which has accumulated inside the filler neck 1 so that no operating liquid reaches the outer side of the filler neck 1 as a result of the ventilation by the ventilation channels 18.

In FIG. 2b, it can be seen that the respective ventilation channels 18 are constructed in a conical manner and taper from the end facing the operating liquid tank 3 to the mouth hole opening 12 thereof. This tapering is produced by the spacing of the outer wall 14a with respect to the inner wall 14b being reduced over the longitudinal extent of the mouth hole neck 11 in the direction of the mouth hole opening 12. As a result of this construction of the upper portion 10 of the filler neck 1, "spitback" and "splashback" can be reduced during a filling operation and in particular during a refueling operation and when the dispensing valve member is switched off since any operating liquid which has been introduced into the ventilation channel 18 can be better separated on the outer wall 14a or on the inner wall 14b as a result of the tapering of the ventilation channel 18. The operating liquid subsequently again flows in the direction of gravitational force into the lower region of the filler neck 1 and via openings which are not illustrated back into the operating liquid tank 3 again.

Figure 3A:
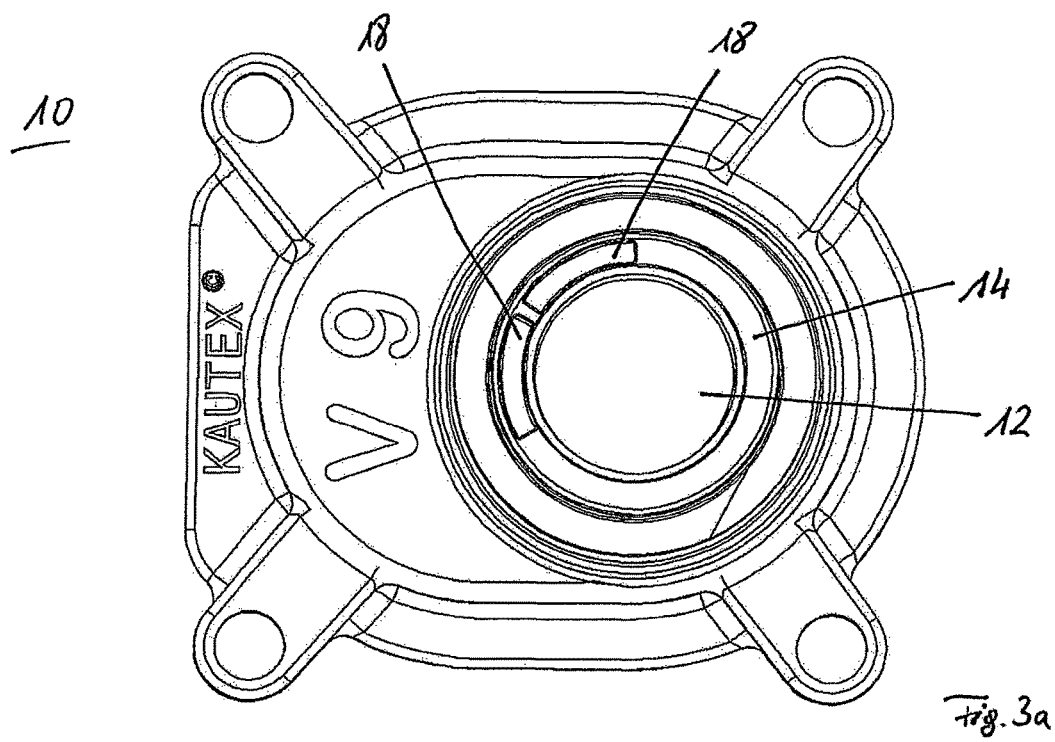
FIG. 3a is a plan view of the upper side of the upper portion of a filler neck according to a second embodiment of the present invention.
Figure 3B:
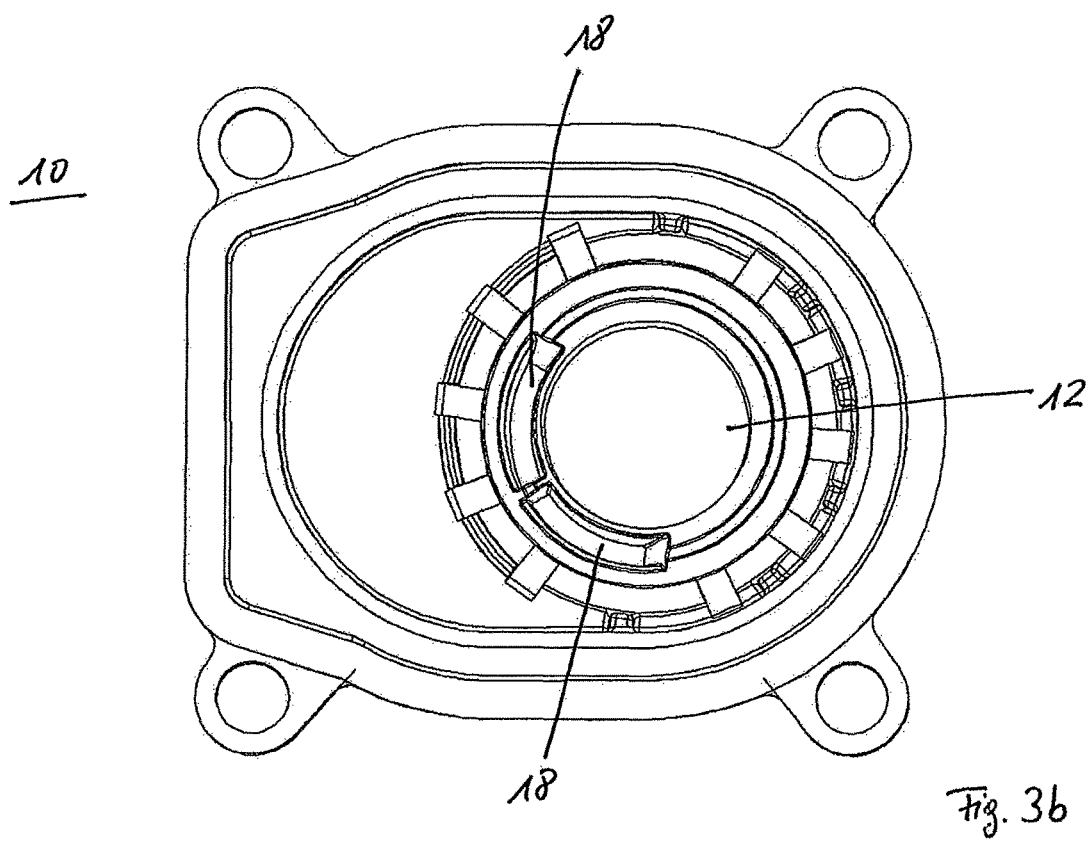
Figure 3C:
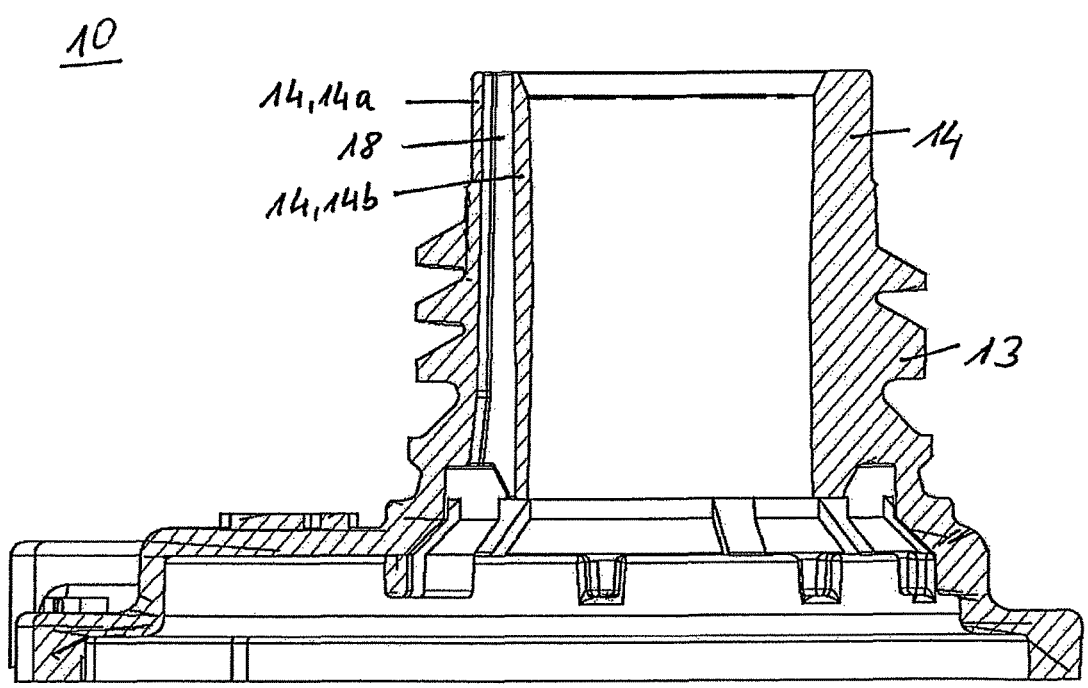
FIG. 3c is a lateral sectioned view of the upper portion of the filler neck illustrated in FIGS. 3a and 3b.

The upper portion 10 illustrated in FIGS. 3a to 3c according to a second embodiment of the present invention differs from the upper portion 10 according to the first embodiment of the invention illustrated in FIGS. 2a and 2b in that the ventilation path comprises only two ventilation channels 18 which are surrounded over the longitudinal extent of the mouth hole neck 11 by the outer wall 14a and the inner wall 14b of the wall 14. The two ventilation channels 18 are separated from each other by means of a radial wall 15.

In FIGS. 3a and 3b, it can be seen that, in a plan view of the mouth hole neck 11, the ventilation channels 18 extend through approximately 110° round the periphery of the mouth hole neck. The cross-sectional surface areas of the respective ventilation channels 18 in the upper portion 10 according to the second embodiment are larger than the cross-sectional surface areas of the respective ventilation channels 18 of the upper portion 10 according to the first embodiment of the present invention.

However, the entire cross-sectional surface area of the ventilation channels 18 of the upper portion 10 according to the second embodiment is not significantly smaller than the entire cross-sectional surface area of the ventilation channels 18 of the upper portion 10 according to the first embodiment since only a single radial wall 15 has to be provided between the two ventilation channels 18 in the upper portion 10 according to the second embodiment. Therefore, a high ventilation volume flow of at least 40 l/min is further achieved.

The two ventilation channels 18 have a corresponding conical construction in the same manner as the ventilation channels 18 of the upper portion 10 according to the first embodiment of the present invention.

Figure 4A:
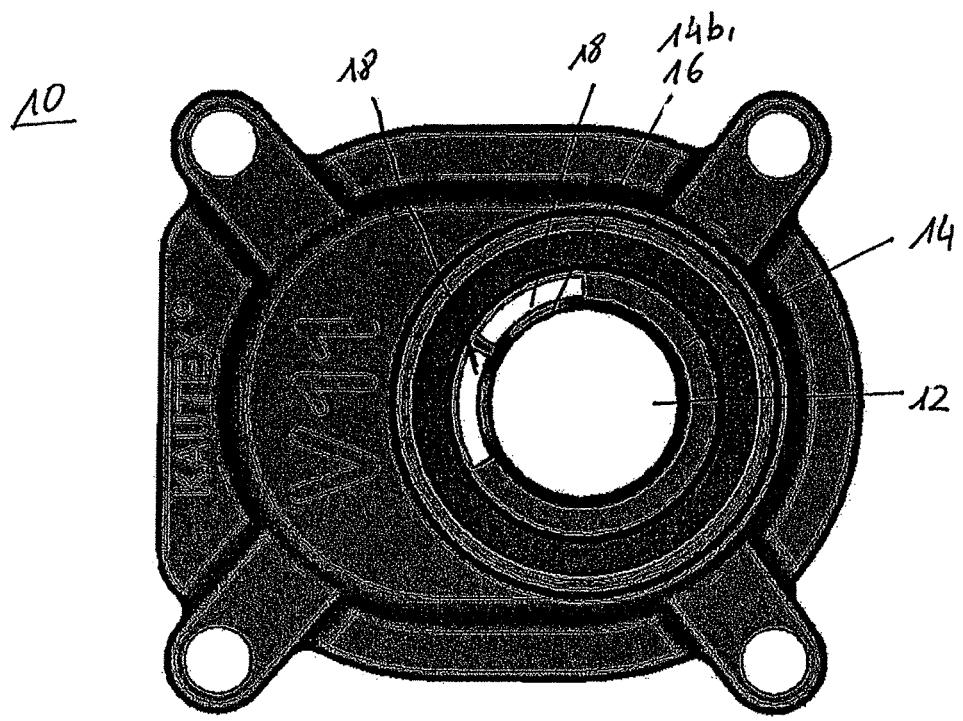
FIG. 4a is a plan view of the upper side of the upper portion of a filler neck according to a third embodiment of the present invention.
Figure 4B:
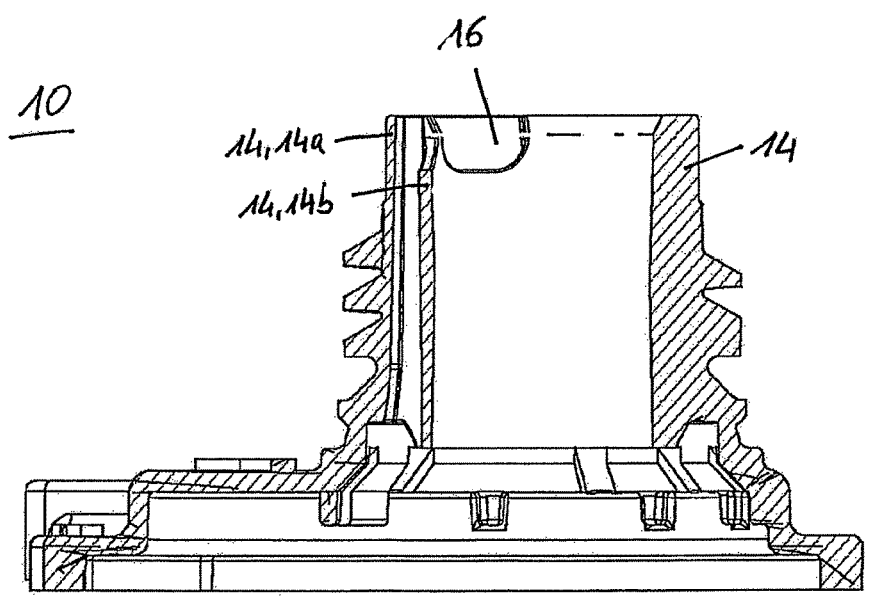
Figure 4C:
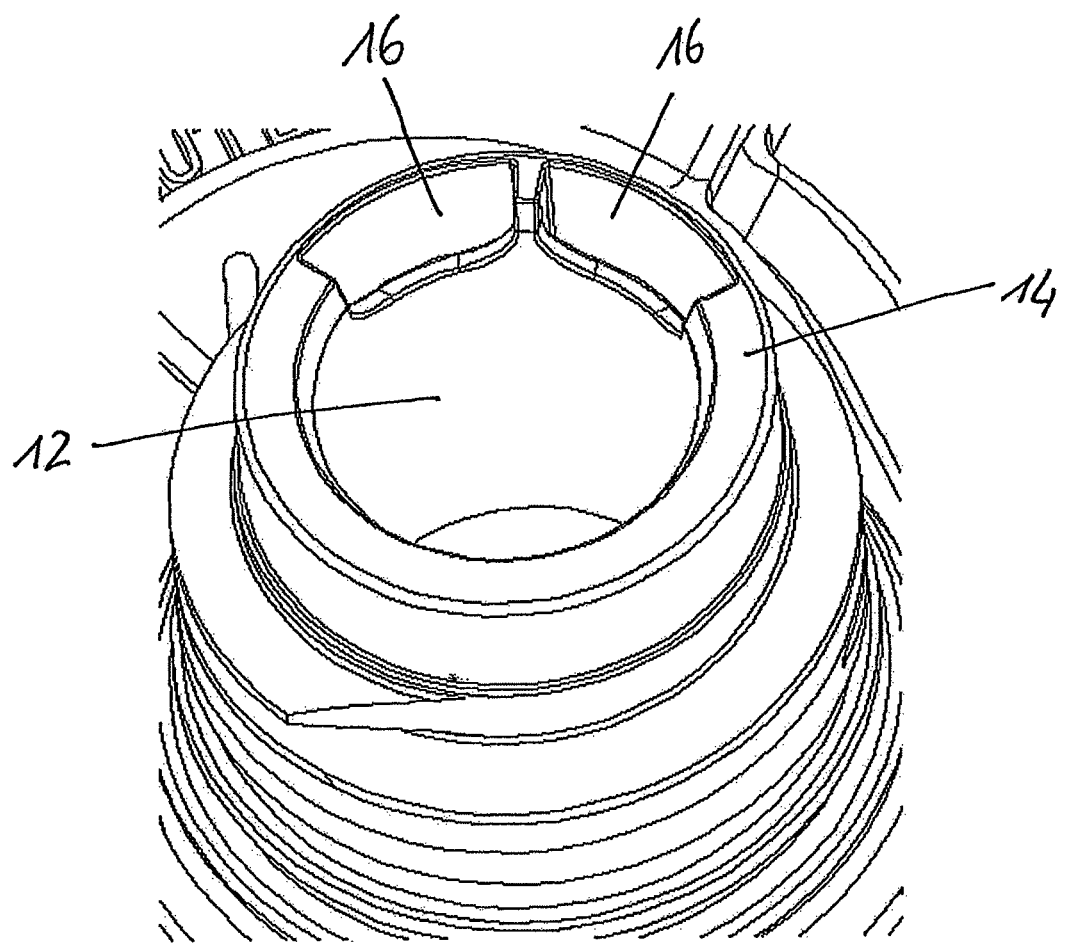
FIG. 4c is a spatial illustration of the upper portion of the filler neck illustrated in FIGS. 4a and 4b.

FIGS. 4a to 4c illustrate an upper portion 10 according to a third embodiment of the filler neck 1 according to the invention, wherein the upper portion is illustrated in FIG. 4a as a plan view, in FIG. 4b as a laterally sectioned view and in FIG. 4c as an oblique spatial view from above.

The upper portion 10 according to the third embodiment differs from the upper portion 10 according to the second embodiment in that the inner wall 14b in the region of the mouth hole opening 12 has material recesses 16 such that the ventilation channels 18 in the region of the mouth hole opening 12 are open in the direction toward the inner space of the mouth hole neck 11. The inner wall 14b consequently has a number of material recesses 16 which corresponds to the number of ventilation channels 18. The remaining construction of the upper portion 10 according to the third embodiment is identical to the construction of the upper portion 10 according to the second embodiment.

As a result of the material recesses 16, the effective cross-sectional surface area of the ventilation channels 18 is increased in the upper region of the mouth hole neck 11 so that a ventilation flow is produced in the ventilation channels 18. Furthermore, a filler neck 1 having the upper portion 10 according to the third embodiment has the same positive properties with respect to "spitback" and "splashback" as a filler neck 1 with an upper portion 10 according to the second embodiment.

Figure 5A:
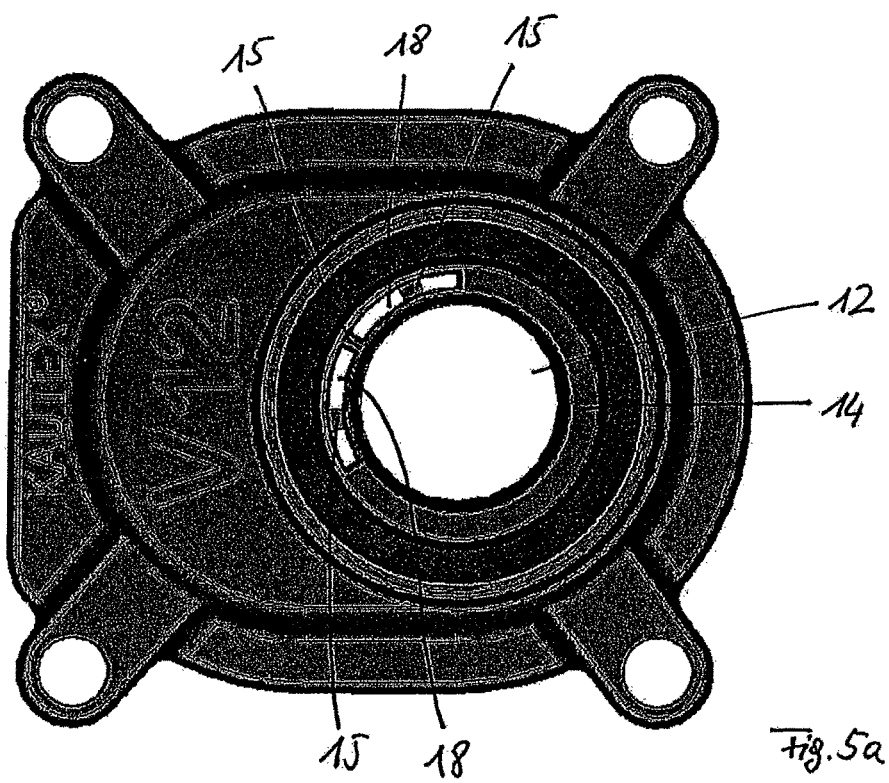
FIG. 5a is a plan view of the upper side of the upper portion of a filler neck according to a fourth embodiment of the present invention.
Figure 5B:
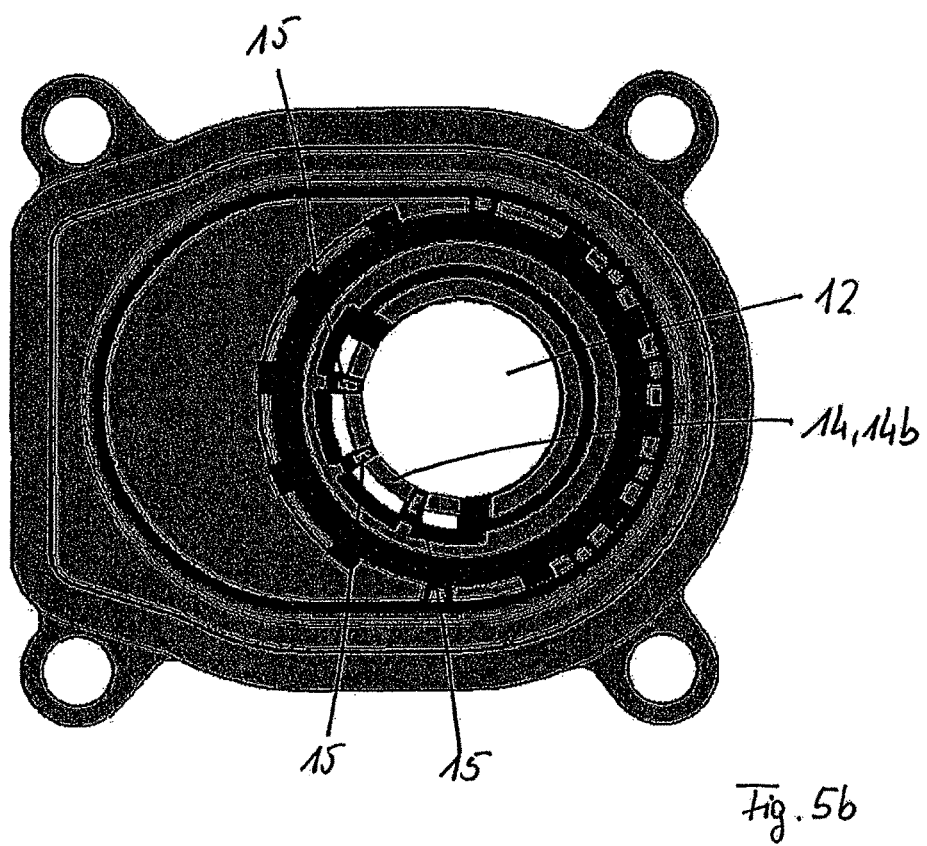
Figure 5C:
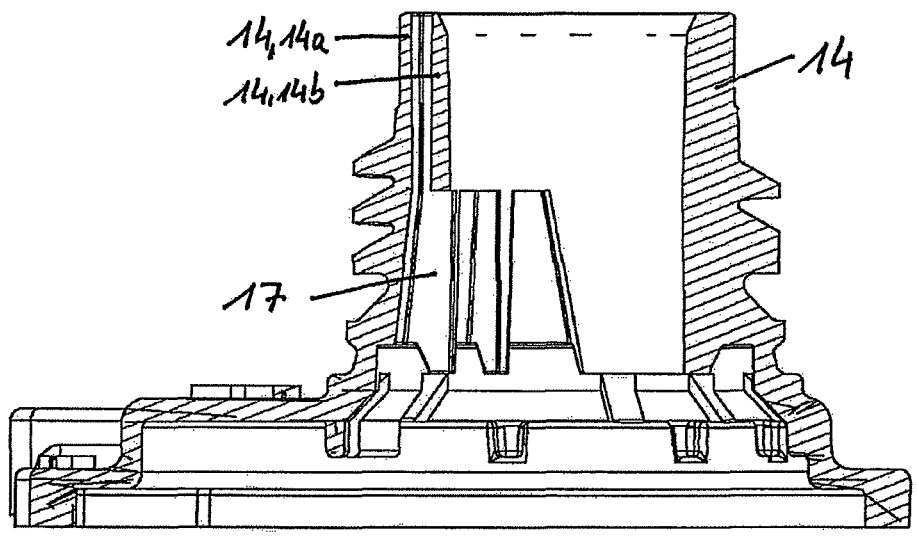
FIG. 5c is a side view of the upper portion of the filler neck illustrated in FIGS. 5a and 5b.
Figure 5D:
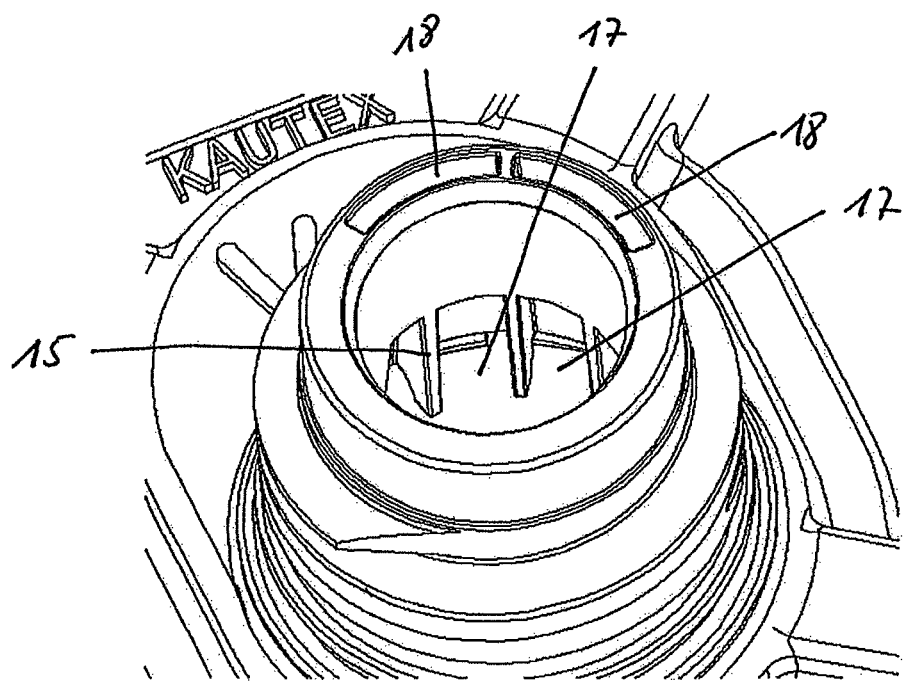
FIG. 5d is a spatial illustration of the upper portion of the filler neck illustrated in FIGS. 5a, 5b and 5c.

In FIGS. 5a to 5d, an upper portion 10 of a filler neck 1 according to a fourth embodiment of the present invention is illustrated. In this instance, FIG. 5a shows the upper portion 10 as a plan view, FIG. 5b shows the lower side of the upper portion 10 as a plan view, FIG. 5c shows the upper portion 10 as a laterally sectioned view and FIG. 5d shows the upper portion 10 as a spatial illustration from a position obliquely above.

The upper portion 10 according to the fourth embodiment differs from the upper portion 10 according to the second embodiment in that the inner wall 14b of the wall 14 which surrounds the ventilation channels 18 has in the region of the end facing away from the mouth hole opening 12 at least one material recess 17 such that the ventilation channels 18 in the region facing away from the mouth hole opening 12 are open in the direction toward the inner space of the mouth hole neck 11.

Furthermore, the two ventilation channels 18 in the region of the material recesses 17 are separated from each other by means of two additional radial walls 15. However, these radial walls 15 which are illustrated in FIG. 5a at the left and right of the central radial wall 15 are not continuous in the longitudinal extent of the mouth hole neck 10, but instead extend only in the region of the material recesses 17. Only the central radial wall 15 is continuous over the entire longitudinal extent of the mouth hole neck 11 and separates the two ventilation channels 18 from each other.

As a result of the material recesses 17 in the lower region of the upper potion 10, the ventilation channels 18 have in the lower region an increased cross section so that an increased ventilation volume flow is enabled, which in turn enables more rapid filling of the operating liquid tank 3. The remaining construction of the upper portion 10 of the filler neck 1 according to the fourth embodiment is identical to the upper portion 10 of the filler neck 1 according to the second embodiment of the present invention.

In all the upper portions 10, there is provided on the mouth hole neck 11 a threaded collar 13 onto which a container which is not illustrated for filling the operating liquid tank 3 can be screwed.

FIG. 6a is a cross section through a filler neck known from the prior art. It can be seen that the ventilation path through the mouth hole neck is not separated from the filling channel. It can further be seen that the ventilation flow is guided through the annular space of the annular magnet 30.

FIG. 6b shows a filler neck 1 according to the present invention in which a compensation volume 31 is illustrated to an enlarged scale. The annular magnet 30 is further retained by means of the inner wall 14b and the wall 14 in such a manner that the ventilation path is guided along the outer side of the annular magnet 30, whereby the ventilation capacity is increased again. The operating liquid tank 3 can thereby again be filled more quickly since more gas can be discharged from the operating liquid tank 3 per time unit.

LIST OF REFERENCE NUMERALS

1 Filler neck
2 Filler pipe
3 Operating liquid tank
4 Connection for filling ventilation line
5 Filling ventilation line
6 Immersion pipe
7 Compensation container
10 Upper portion of the filler neck
11 Mouth hole neck
12 Mouth hole opening/Mouth hole
13 Threaded collar
14 Wall (of the mouth hole neck)
14a Outer wall (of the wall)
14b Inner wall (of the wall)
15 Radial wall (between the outer wall and the inner wall)
16 Material recess
17 Material recess
18 Ventilation channel
19 Securing opening
20 Lower portion of the filler neck
30 Annular magnet
31 Compensation volume

The invention claimed is:

1. A filler neck for an operating liquid tank for a motor vehicle, wherein the filler neck comprises:
   a mouth hole neck in which a dispensing valve member is introducible to fill the operating liquid tank;
   a ventilation path which, during a filling operation, permits a ventilation flow parallel with and counter to a filling volume flow through the mouth hole neck;
   the ventilation path comprises at least one ventilation channel which is provided in a wall of the mouth hole neck, the wall of the mouth hole neck having an inner wall and an outer wall, and the at least one ventilation channel surrounded by the outer wall and the inner wall of the wall of the mouth hole neck over at least a portion of a longitudinal extent of the at least one ventilation channel;

wherein the inner wall of the wall of the mouth hole neck which surrounds the at least one ventilation channel has in a region of a mouth hole opening at least one material recess arranged such that the at least one ventilation channel in the region of the mouth hole opening is open in a direction toward an inner space of the mouth hole neck.

2. The filler neck as claimed in claim 1, wherein the ventilation path of the filler neck comprises at least two ventilation channels which are separated from each other by a radial wall which is connected to the inner wall and the outer wall.

3. The filler neck as claimed in claim 1, wherein the at least one ventilation channel is constructed in a conical manner and tapers from an end facing the operating liquid tank to the mouth hole opening.

4. The filler neck as claimed in claim 1, wherein the inner wall of the wall of the mouth hole neck which surrounds the at least one ventilation channel has in a region of an end facing away from the mouth hole opening at least one additional material recess arranged such that the at least one ventilation channel in the region facing away from the mouth hole opening is open in the direction toward the inner space of the mouth hole neck.

5. The filler neck as claimed in claim 1, wherein there is provided in the filler neck an annular magnet which is arranged upstream of the mouth hole neck with respect to the ventilation flow.

6. The filler neck as claimed in claim 5, wherein the ventilation path leads along the outer side of the annular magnet.

7. The filler neck as claimed in claim 1, wherein the at least one ventilation channel is in a plan view of the mouth hole neck arranged so as not to extend completely in the wall thereof.

8. The filler neck as claimed in claim 7, wherein in a plan view of the mouth hole neck the at least one ventilation channel extends through less than 300° round the periphery of the mouth hole neck.

9. The filler neck as claimed in claim 1, wherein the at least one ventilation channel has in total a cross-sectional surface area of between 10 $mm^2$ and 100 $mm^2$.

* * * * *